United States Patent

Maguire et al.

(10) Patent No.: US 9,346,480 B2
(45) Date of Patent: May 24, 2016

(54) HAND SENSING ON STEERING WHEEL USING HEATER ELEMENT

(71) Applicant: TK Holdings Inc., Auburn Hills, MI (US)

(72) Inventors: Phillip B. Maguire, Bloomfield TWP, MI (US); Jeff Bennett, Brownstown, MI (US)

(73) Assignee: TK HOLDINGS INC., Auburn Hills, MI (US)

( * ) Notice: Subject to any disclaimer, the term of this patent is extended or adjusted under 35 U.S.C. 154(b) by 312 days.

(21) Appl. No.: 14/092,204

(22) Filed: Nov. 27, 2013

(65) Prior Publication Data

US 2014/0151356 A1  Jun. 5, 2014

Related U.S. Application Data

(60) Provisional application No. 61/731,756, filed on Nov. 30, 2012.

(51) Int. Cl.
  *H05B 1/02* (2006.01)
  *B62D 1/06* (2006.01)
  *B62D 1/04* (2006.01)
  *B60N 2/00* (2006.01)

(52) U.S. Cl.
  CPC *B62D 1/046* (2013.01); *B62D 1/06* (2013.01); *B62D 1/065* (2013.01); *H05B 1/0236* (2013.01); *B60N 2/002* (2013.01)

(58) Field of Classification Search
  None
  See application file for complete search history.

(56) References Cited

U.S. PATENT DOCUMENTS

| | | | | |
|---|---|---|---|---|
| 6,184,501 B1 * | 2/2001 | Zapf | .............. | H05B 3/746 219/447.1 |
| 6,348,677 B2 * | 2/2002 | Aurre | .............. | 219/448.11 |
| 6,614,006 B2 * | 9/2003 | Pastore | .............. | H05B 3/746 219/447.1 |
| 6,664,517 B2 | 12/2003 | Nagatomo | | |
| 8,278,602 B2 | 10/2012 | Yoneyama et al. | | |
| 8,330,079 B2 * | 12/2012 | Yasuda | .............. | B62D 1/065 219/204 |
| 2001/0023868 A1 * | 9/2001 | Aurre | .............. | H05B 3/746 219/518 |
| 2002/0170900 A1 * | 11/2002 | Braeuchle et al. | .............. | 219/204 |
| 2010/0038351 A1 * | 2/2010 | Tabaczynski | .............. | H05B 1/0238 219/202 |
| 2012/0050907 A1 | 3/2012 | Haapala | | |
| 2013/0056455 A1 * | 3/2013 | Onishi | .............. | B62D 1/065 219/204 |
| 2013/0092677 A1 * | 4/2013 | Virnich et al. | .............. | 219/204 |
| 2013/0098890 A1 * | 4/2013 | Virnich et al. | .............. | 219/204 |
| 2013/0292368 A1 * | 11/2013 | Cho | .............. | B62D 1/065 219/204 |
| 2014/0339211 A1 * | 11/2014 | Barfuss et al. | .............. | 219/202 |
| 2015/0102024 A1 * | 4/2015 | Barfuss et al. | .............. | 219/204 |

FOREIGN PATENT DOCUMENTS

KR  10-2011-0038291  4/2011
WO  WO-2011/079092  6/2011

OTHER PUBLICATIONS

International Search Report dated Mar. 17, 2014 issued in connection with International Application No. PCT/US2013/072214.
Written Opinion of the International Searching Authority mailed Mar. 17, 2014 issued in connection with International Application No. PCT/US2013/072214.

* cited by examiner

*Primary Examiner* — Joseph M Pelham
(74) *Attorney, Agent, or Firm* — Gordon & Rees LLP

(57) ABSTRACT

A steering wheel system for vehicle includes a steering wheel configured to be gripped by an occupant and a first electrode positioned within a first sensing zone on the steering wheel. The first electrode is configured to generate heat when a first signal is supplied to the first electrode. The first electrode is configured to be used to determine the proximity of a hand of an occupant of the vehicle to the first sensing zone when a second signal is supplied to the first electrode. The steering wheel system also includes a controller configured to control the supply of the first and second signals to the first electrode based on the proximity of the hand of the occupant to the first sensing zone.

18 Claims, 4 Drawing Sheets

HAND SENSING ON STEERING WHEEL USING HEATER ELEMENT

CROSS-REFERENCE TO RELATED PATENT APPLICATIONS

This application claims priority to and the benefit of U.S. Provisional Patent Application No. 61/731,756, filed Nov. 30, 2012. The foregoing application is incorporated herein by reference in its entirety.

BACKGROUND

The present application relates generally to the field of occupant sensor systems.

More particularly, this application relates to an improved steering wheel system which is configured to be used to determine the proximity of a hand of an occupant of the vehicle and generate heat for the driver (e.g., via a heating element). Various occupant sensor systems are known in the art which use electrodes to sense a presence of an occupant.

In colder regions of the world, during colder months, it may be desirable to provide a vehicle with heating elements in particular locations (e.g., a vehicle seat, a vehicle steering wheel, etc.) which a vehicle occupant contacts, so as to provide warmth to the occupant and improve the occupant's driving experience. Difficulties may arise when trying to design an occupant sensor system which use electrodes to sense a presence of an occupant which is in relative close proximity to a heating element configured to provide warmth to the occupant. For example, without a shield layer positioned between an electrode and a heating element, the electrical coupling between the electrode and the heating element may be greater than the electrical coupling between a vehicle occupant and the electrode. As a result, the presence of the occupant may not be reliably determined by the electrode. Further, including a shield layer between sensor electrodes and a heating element may be prohibitively costly and difficult to package.

Thus, it would be advantageous to package (i.e., position, locate, provide) an occupant sensor system and a heating element in relative close proximity, such that the system may simultaneously detect the presence of an occupant and provide heat to the occupant.

SUMMARY

According to a disclosed embodiment, a steering wheel system for a vehicle may include a steering wheel configured to be gripped by an occupant and a first electrode positioned within a first sensing zone on the steering wheel. The first electrode may be configured to generate heat when a first signal is supplied to the first electrode. The first electrode may be configured to be used to determine the proximity of a hand of an occupant of the vehicle to the first sensing zone when a second signal is supplied to the first electrode. The steering wheel system may also include a controller configured to control the supply of the first and second signals to the first electrode based on the proximity of the hand of the occupant to the first sensing zone.

According to an alternative embodiment, a steering wheel system for a vehicle may include a steering wheel, a first electrode positioned within a first sensing zone on the steering wheel, and a second electrode positioned within a second sensing zone on the steering wheel. Each of the first and second electrodes may be configured to generate heat when a first signal is supplied to the electrode, and each of the first and second electrodes may be configured to be used to determine the proximity of a hand of an occupant of the vehicle to one of the sensing zones when a second signal is supplied to the electrode. The steering wheel system may also include a sensing circuit for determining the proximity of the hand of an occupant of the vehicle to one of the sensing zones based on the second signal supplied to the first and second electrodes.

BRIEF DESCRIPTION OF THE DRAWINGS

Features, aspects, and advantages of the present invention will become apparent from the following description, and the accompanying exemplary embodiments shown in the drawings, which are briefly described below.

DETAILED DESCRIPTION

It is to be understood that both the foregoing general description and the following detailed description are exemplary and explanatory only.

The occupant detection system employed with the steering wheel system may be similar to the systems disclosed in U.S. Published Application No. 2007/0192007 (incorporated by reference herein). For example, the sensing circuit (e.g., the ASIC) could be designed to provide data relating to the change in the complex impedance described in the foregoing application in order to detect that an occupant's hand is proximate to the steering wheel. Also, the between the operation of the heater and the sensing system could employ the methodology and structural features disclosed in U.S. Pat. No. 7,521,940 (incorporated by reference herein).

Figure 1:
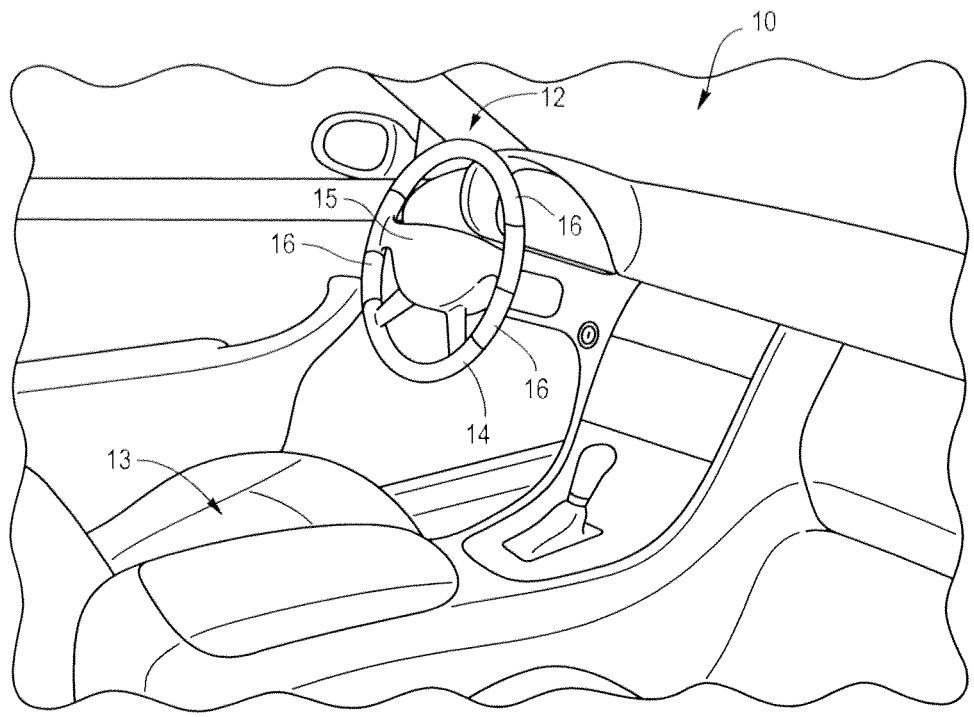
FIG. 1 is a perspective view of a vehicle interior.

Referring to FIG. 1, a vehicle driver may operate a vehicle from a cockpit (vehicle interior) 10 with a steering wheel 12 and a vehicle seat (e.g., the driver's seat 13). When sitting on the driver's seat 13, the driver may rotate the steering wheel 12 to turn the vehicle wheels and steer the vehicle in a desired direction. The steering wheel 12 may also include various controls in the form of switches or buttons provided within easy reach of the driver, such as controls for a vehicle audio system (e.g., volume, tuning, mode, etc.), controls for vehicle lighting (e.g., overhead lighting, headlights, etc.), phone controls, cruise control, or other suitable control. It should be understood by those skilled in the art that the steering wheel 12 may include any combination of the controls disclosed herein, according to various exemplary embodiments, and that these configurations are not intended to limit the possible arrangements of controls provided on the steering wheel 12. For example, elements used in one exemplary embodiment may be used in various combinations with elements used in another exemplary embodiment.

Figure 2:
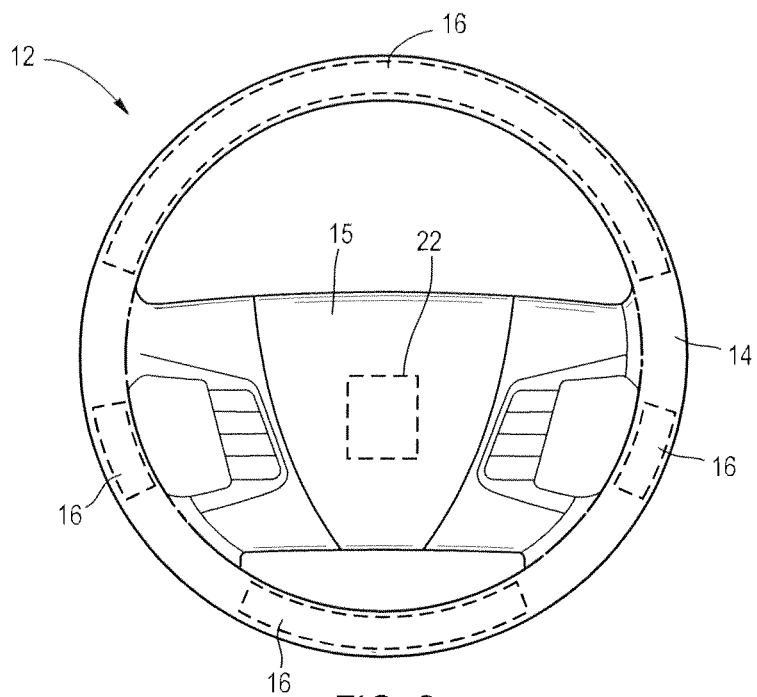
FIG. 2 is a schematic front view of a steering wheel including an occupant sensing system which includes a plurality of heater zones, according to an exemplary embodiment.

Referring now to FIG. 2, the steering wheel 12 is shown having a particular design. As shown, the steering wheel 12 may include a ring-like outer portion 14 and an inner portion 15 coupled to a steering column of the vehicle. The outer portion 14 may be formed of a rigid frame or armature, which may be partially covered by an outer layer (e.g., a skin, covering, wrap, etc.). The outer layer may be configured to provide an aesthetically pleasing exterior for the steering wheel 12 and add an ergonomically pleasing layer (i.e., such that the skin improves the ergonomics, feel, grip, etc. of the steering wheel 12) to an outer surface of the steering wheel 12. Although a particular steering wheel is described herein, it should be readily understood that a steering wheel system according to the exemplary embodiments disclosed in this Application may have any suitable configuration, and that the particular outer and inner portions are not limiting.

Further, the outer portion 14 of the steering wheel 12 may include one or more heater zones 16. The heater zones may be configured to be selectively activated to warm the hands of the driver. For example, the heater zones 16 may include a resistive heating element 18 (not shown in FIG. 2, but see, e.g., FIGS. 3-5). It should be understood that the number, location, and configuration of the heater zones 16 as shown in the figures is exemplary, and is not intended to limit the possible various configurations of heater zones provided on a steering wheel. For example, the steering wheel 12 may include a greater or fewer number of heater zones 16 then shown in the figures. The heater zones 16 may be provided in any suitable place on the steering wheel 12 (e.g., along the outer portion 14 or on the inner portion 15).

Figure 3:
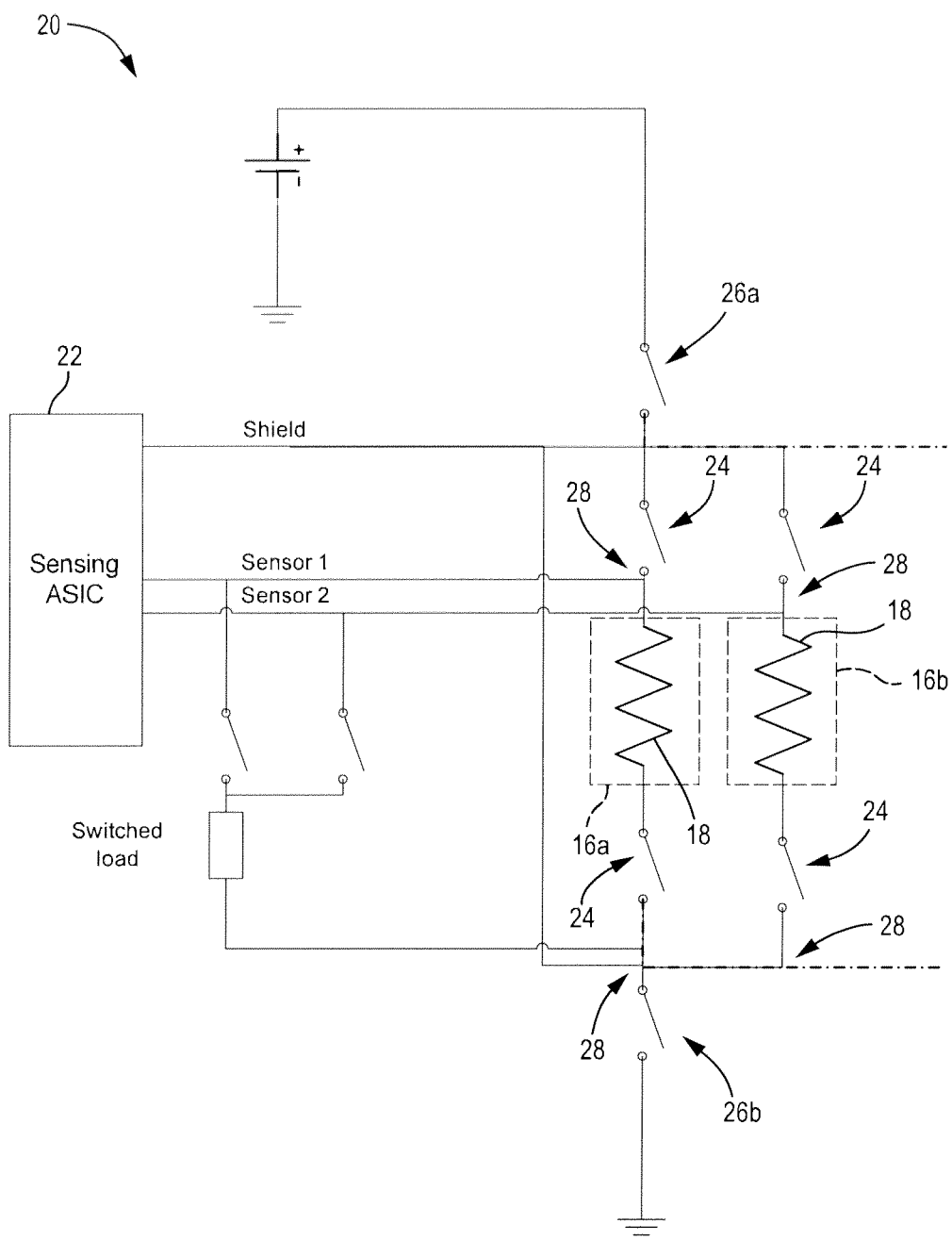
FIG. 3 is a schematic diagram of an occupant sensing system having a parallel configuration.
Figure 4:
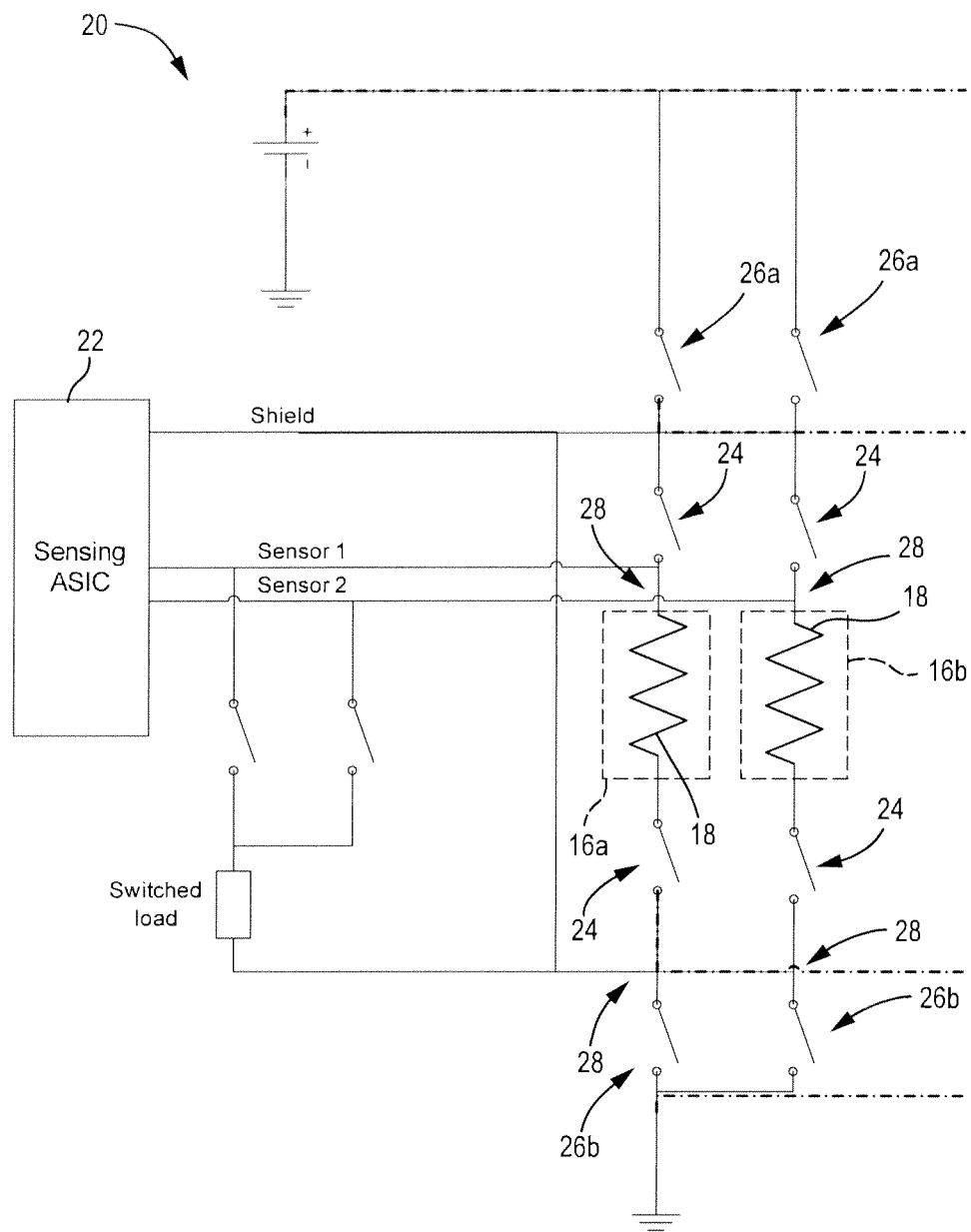
FIG. 4 is a schematic diagram of an occupant sensing system having another parallel configuration.
Figure 5:
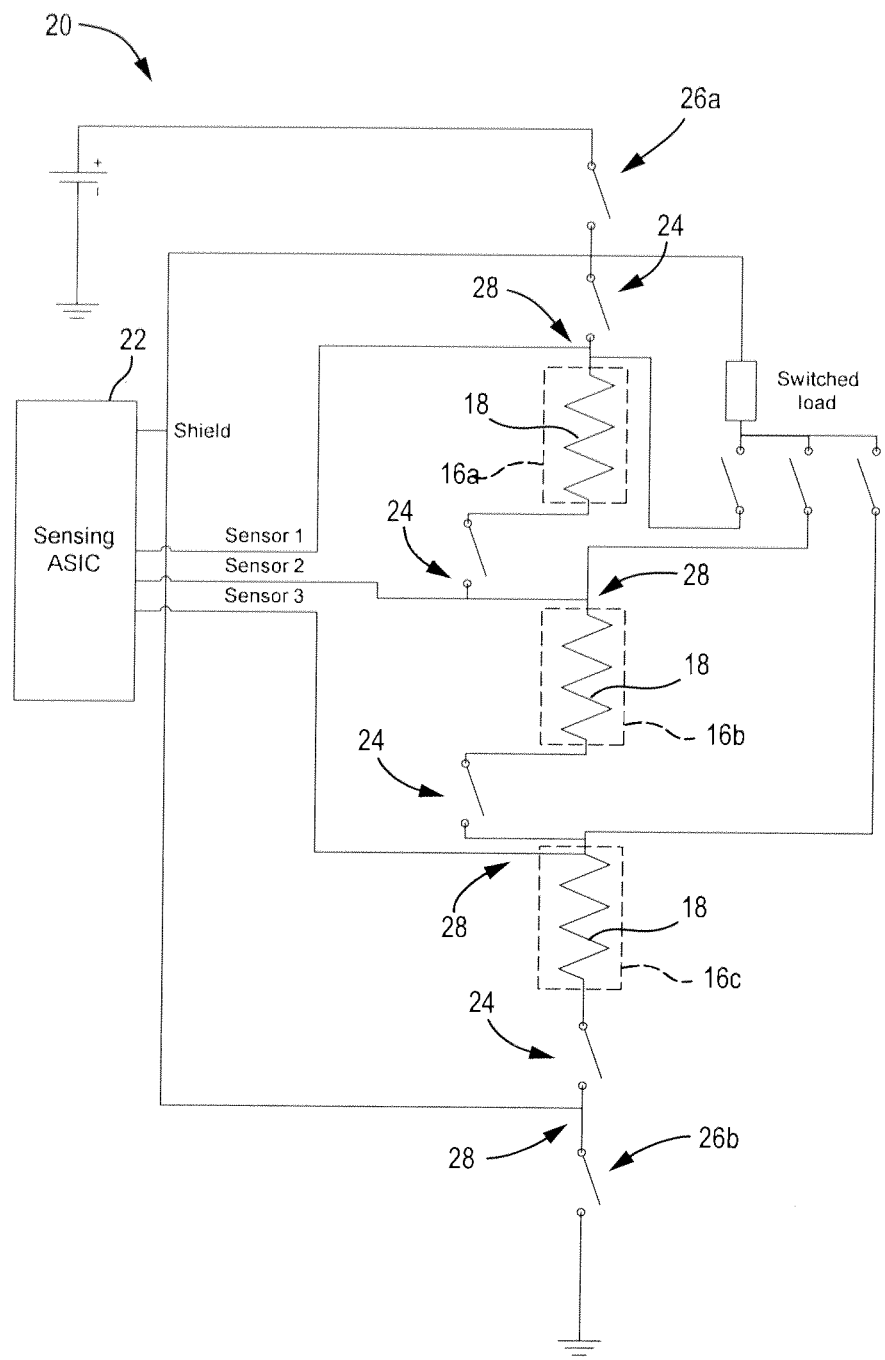
FIG. 5 is a schematic diagram of an occupant sensing system having a series configuration.

As shown in FIGS. 3-5, according to an exemplary embodiment, a steering wheel system 20 may include at least one heater zone 16. According to an exemplary embodiment, the steering wheel system 20 may include a sensing circuit configured to detect the presence of the driver (e.g., a portion of the driver's body, such as the driver's legs, hands, etc.). The sensing circuit may be configured in various ways. For example, the sensing circuit may be an ASIC, an integrated circuit, or have any other suitable configuration. The sensing circuit may include a controller, such as the processor 22.

According to an exemplary embodiment, an electrode (e.g., a heating element 18) is positioned within a sensing zone (e.g., a heater zone 16) of the steering wheel 12. The steering wheel system 20 may include any suitable number of such electrodes positioned within any suitable number of sensing zones. The electrode may be used to provide warmth for a vehicle occupant when a heating signal (e.g., a first signal) is supplied to the electrode (i.e., the electrode may generate heat for the driver's hands). Further, the electrode may be used to determine the proximity of a hand of an occupant of the vehicle to the sensing zone when a sensing signal (e.g., a second signal) is supplied to the electrode. The heating signal may carry a higher current relative to the sensing signal. In this manner, the electrode is cooperatively configured to be used as a sensor and a heater. Thus, the electrode may alleviate (i.e., reduce, improve, lessen, etc.) the costs and the packaging difficulties associated with adding a separate sensor and shield over a top of a heating element for a heater zone.

The electrode may be coupled to a vehicle power supply (e.g., the vehicle's DC bus which may be supplied power by a batter or alternator, for example). Further, the vehicle power supply may be used to supply the heating signal to the electrode. The steering wheel system 20 may include a variety of controls, sensors, and other elements used to control or regulate the heating signal, so as to control the temperature of the heater zone (so the steering wheel 12 does not overheat).

According to an exemplary embodiment, the sensing circuit (which may include an electronic controller) is configured to control the supply of the sensing signal and the heating signal to the electrode based on the proximity of the hand of the occupant to a sensing zone. For example, according to an exemplary embodiment, the sensing circuit may not supply the heating signal to the electrode until or unless a hand is detected in proximity to the heater zone. In other words, the steering wheel system 20 may be configured to automatically supply a heating signal to the electrode when a hand is sensed.

According to an exemplary embodiment, the controller is configured to supply the heating signal and the sensing signal to the electrode on an alternating basis at a pre-determined time interval. Further, the heating and sensing signals may be time-multiplexed between multiple electrodes, according to how multiple electrodes are arranged in the steering wheel system 20 (i.e., whether multiple electrodes are arranged in parallel or series).

The steering wheel system 20 may include a variety of inductors positioned in-line with the heating element 18. The inductors may function as a switch, so as to switch between a high impedance in a sensing mode and a low impedance in a heating mode. The inductors may have any suitable impedance at the sensing frequency in the sensing mode and at the heating frequency in the heating mode. An inductor may be any suitable inductor, such as a field-effect transistor (FET), diodes, and a common mode choke. A switch load may be used in the sensing mode to calibrate the electrode.

According to an exemplary embodiment, a driven shield signal may be imposed to shield a sensing signal from the inductors. Further, a multi-measurement approach may be utilized which may involve applying multiple driven shield signal levels to the shielded nodes and switching in impedance between the sensor and shield nodes. In this way, an error caused by (i.e., resulting from, attributed to, etc.) the configuration of inductors (i.e., the measurement architecture) may be reduced, cancelled, lessened, etc.

Referring to FIGS. 3-5, various architectural examples for the sensor systems 20 are shown with the high-side and low-side FETs shown as switches 26a, 26b, respectively. Further, the sensor systems 20 are shown to include high current switches 24 as an additional impedance source or inductor between the switches 26 for the heating elements 18 and the sensing nodes 28. However, as described above, in alternative exemplary embodiments, an impedance source may include FETs, diodes, inductors, a common mode choke, or any other suitable element having an appropriate impedance.

With reference to FIG. 3, the sensor system 20 is shown as having a parallel heating setup where the sensing and heating is time multiplexed. As shown in FIG. 3, the sensor system 20 may include a high-side switch 26a and a low-side switch 26b for multiple heater zones 16. Such a parallel heating setup may reduce the complexity and cost of the sensor system 20. Further, each heater zone 16 may include an isolation impedance source (i.e., an inductor), shown as switch 24, on either side of the heating element 18. As shown in FIG. 3, the sensor system 20 may be configured to sense the presence of a vehicle occupant when heating is off for all heater zones 16. It should be understood by those skilled in the art that, while two heater zones 16 and two sensors are shown in FIG. 3, the sensor system 20 could be configured to include any number of heater zones and any number of sensors.

Referring now to FIG. 4, the sensor system 20 may include a parallel heating setup in which an occupant sensing function and a heating function are time-multiplexed for individual sensing/heating zones. For example, the sensor system 20 shown in FIG. 4 is configured to simultaneously sense the presence of an occupant in a first heater zone 16a and provide warmth/heat in a second heater zone 16b. After a specified period of time, the first and second heater zones 16a, 16b may alternate (i.e., switch) functions, such that the sensor system 20 is configured to simultaneously sense the presence of an occupant in the second heater zone 16b and provide warmth/heat in the first heater zone 16a. A high-side switch 26a and a low-side switch 26*b* is provided for each of the heater zones 16*a*, 16*h*. It should be understood by those skilled in the art that, while two heater zones 16 and two sensors are shown in FIG. 4, the sensor system 20 could be configured to include any number of heater zones and any number of sensors.

Referring now to FIG. 5, the sensor system 20 may include a series heating setup in which an occupant sensing function and a heating function are time-multiplexed. The sensor system 20, as shown in FIG. 5, may include a high-side switch 26*a* and a low-side switch 26*b*. Further, the sensor system 20 shown in FIG. 5 may include less isolation impedance sources (e.g., switches 24) when compared to a parallel design (e.g., as described above and shown in FIGS. 3-4). Thus, the cost of a sensor system 20 having a series design may be less than a sensor system 20 having a parallel design. Further, as shown in FIG. 5, the sensor system 20 having a series design may sense the presence of an occupant in a single heater zone 16 if a heating function for each heater zone 16 is off. It should be understood by those skilled in the art that, while three heater zones 16 and three sensors are shown in FIG. 5, the sensor system 20 could be configured to include any number of heater zones and any number of sensors.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the sensors and heating elements may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

What is claimed is:
1. A steering wheel system for a vehicle, comprising:
a steering wheel configured to be gripped by an occupant;
a first electrode positioned within a first sensing zone on the steering wheel; and
wherein the first electrode is configured to generate heat when a first signal is supplied to the first electrode;
wherein the first electrode is configured to be used to determine the proximity of a hand of an occupant of the vehicle to the first sensing zone when a second signal is supplied to the first electrode;
a controller configured to control the supply of the first and second signals to the first electrode based on the proximity of the hand of the occupant to the first sensing zone, and
a second electrode positioned within a second sensing zone on the steering wheel;
wherein the second electrode is configured to generate heat when a first signal is supplied to the second electrode;
wherein the second electrode is configured to be used to determine the proximity of a hand of the occupant of the vehicle to the second sensing zone when a second signal is supplied to the second electrode;

wherein the controller is configured to control the supply of the first and second signals to the second electrode based on the proximity of the hand of the occupant to the second sensing zone.

2. The steering wheel system of claim 1, wherein the first and second electrodes are arranged in a parallel configuration.

3. The steering wheel system of claim 1, wherein the controller is configured to supply the first and second signals to the first and second electrodes on an alternating basis at a pre-determined time interval.

4. The steering wheel system of claim 1, wherein the first and second electrodes are arranged in a series configuration.

5. The steering wheel system of claim 2, wherein a first inductor is positioned on a first side of the first and second electrodes and a second inductor is positioned on a second side of the first and second electrodes, opposite the first side.

6. The steering wheel system of claim 2, wherein the first electrode is positioned between a first inductor and a second inductor;

wherein the second electrode is positioned between a third inductor and a fourth inductor.

7. A steering wheel system for a vehicle, comprising:
a steering wheel;
a first electrode positioned within a first sensing zone on the steering wheel; and
a second electrode positioned within a second sensing zone on the steering wheel;
wherein each of the first and second electrodes are configured to generate heat when a first signal is supplied to the electrode;
wherein each of the first and second electrodes are configured to be used to determine the proximity of a hand of an occupant of the vehicle to one of the sensing zones when a second signal is supplied to the electrode;
a sensing circuit for determining the proximity of the hand of an occupant of the vehicle to one of the sensing zones based on the second signal supplied to the first and second electrodes.

8. The steering wheel system of claim 7, further comprising a controller configured to control the supply of the first and second signals to the first and second electrodes based on an output of the sensing circuit.

9. The steering wheel system of claim 8, wherein the first and second electrodes are arranged in a parallel configuration.

10. The steering wheel system of claim 9, wherein the controller is configured to supply the first and second signals to the first and second electrodes on an alternating basis at a pre-determined time interval.

11. The steering wheel system of claim 8, wherein the first and second electrodes are arranged in a series configuration.

12. The steering wheel system of claim 8, wherein the controller is configured to supply the first and second signals in a time multiplexed manner when the occupant's hand is determined to be proximate to at least one of the sensing zones.

13. The steering wheel system of claim 7, wherein a first inductor is positioned on a first side of the first and second electrodes and a second inductor is positioned on a second side of the first and second electrodes, opposite the first side.

14. The steering wheel system of claim 7, wherein the first electrode is positioned between a first inductor and a second inductor; and wherein the second electrode is positioned between a third inductor and a fourth inductor.

15. A steering wheel system for a vehicle, comprising:
a steering wheel configured to be gripped by an occupant:
a first electrode positioned within a first sensing zone on the steering wheel:
wherein the first electrode is configured to generate heat when a first signal is supplied to the first electrode;
wherein the first electrode is configured to be used to determine the proximity of a hand of an occupant of the vehicle to the first sensing zone when a second signal is supplied to the first electrode;
a controller configured to control the supply of the first and second signals to the first electrode based on the proximity of the hand of the occupant to the first sensing zone;
wherein the controller is configured to supply the first and second signals in a time multiplexed manner when the occupant's hand is determined to be proximate to the first sensing zone; and further comprising
a second electrode positioned within a second sensing zone on the steering wheel;
wherein the second electrode is configured to generate heat when a first signal is supplied to the second electrode;
wherein the second electrode is configured to be used to determine the proximity of a hand of the occupant of the vehicle to the second sensing zone when a second signal is supplied to the second electrode.

16. The steering wheel system of claim 15, wherein the controller is configured to control the supply of the first and second signals to the second electrode based on the proximity of the hand of the occupant to the second sensing zone.

17. The steering wheel system of claim 15, wherein the first and second electrodes are arranged in a parallel configuration.

18. The steering wheel system of claim 15, wherein the first and second electrodes are arranged in a series configuration.

* * * * *